US012712206B2

(12) United States Patent
Kim et al.

(10) Patent No.: US 12,712,206 B2
(45) Date of Patent: Aug. 18, 2026

(54) NON-AQUEOUS ELECTROLYTE AND LITHIUM SECONDARY BATTERY INCLUDING THE SAME

(71) Applicant: LG Energy Solution, Ltd., Seoul (KR)

(72) Inventors: Hyung Tae Kim, Daejeon (KR); Chul Haeng Lee, Daejeon (KR); Young Cheol Choi, Daejeon (KR); Bo Ram Lee, Daejeon (KR); Chul Eun Yeom, Daejeon (KR); Chang Ik Song, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 19/115,598

(22) PCT Filed: Sep. 21, 2023

(86) PCT No.: PCT/KR2023/014391
§ 371 (c)(1),
(2) Date: Mar. 26, 2025

(87) PCT Pub. No.: WO2024/071832
PCT Pub. Date: Apr. 4, 2024

(65) Prior Publication Data

US 2025/0260055 A1 Aug. 14, 2025

(30) Foreign Application Priority Data

Sep. 30, 2022 (KR) ........................ 10-2022-0125851

(51) Int. Cl.
*H01M 10/0567* (2010.01)
*H01M 4/505* (2010.01)
*H01M 10/052* (2010.01)
*H01M 10/0569* (2010.01)
*H01M 10/0525* (2010.01)

(52) U.S. Cl.
CPC ....... *H01M 10/0567* (2013.01); *H01M 4/505* (2013.01); *H01M 10/052* (2013.01); *H01M 10/0569* (2013.01); *H01M 10/0525* (2013.01); *H01M 2300/0037* (2013.01)

(58) Field of Classification Search
CPC ........... H01M 10/052; H01M 10/0525; H01M 10/0567
See application file for complete search history.

(56) References Cited

U.S. PATENT DOCUMENTS 4,716,118 A 12/1987 Wolfbeis et al.
2004/0076887 A1 4/2004 Panitz et al.
2006/0105246 A1* 5/2006 Shin .................. H01M 10/0525 429/340
2011/0006738 A1* 1/2011 Mikhaylik ............ H01M 10/44 429/231.5
2011/0104565 A1* 5/2011 Utsumi ............... H01M 50/394 429/188
2014/0212755 A1 7/2014 Wu et al.
2019/0214683 A1 7/2019 Yu et al.
2020/0083522 A1* 3/2020 Han ...................... H01M 4/131
2021/0399345 A1 12/2021 Yu et al.
2022/0209299 A1 6/2022 Lee et al.
2024/0055651 A1* 2/2024 Xu ................... H01M 10/0569

FOREIGN PATENT DOCUMENTS

CN 102569889 A 7/2012
CN 104193889 A 12/2014
CN 113767502 A 12/2021
EP 4550507 A1 5/2025
JP H1050344 A 2/1998
JP 3680454 B2 8/2005
JP 4036695 B2 1/2008
JP 4503923 B2 7/2010
JP 5598850 B2 10/2014
KR 20210060330 A 5/2021
KR 20210064175 A 6/2021
WO WO-2015123552 A1 * 8/2015 ................ A61P 9/12

OTHER PUBLICATIONS

Guruprasadagowda, Y.K. et al., "Tetrakis coumarin as efficient electrode material for rechargeable lithium ion battery", Journal of Electroanalytical Chemistry, Jan. 24, 2022, vol. 908, 116081, pp. 1-5.
International Search Report for Application No. PCT/KR2023/014391 mailed Dec. 26, 2023. 3 pages.
Parmar, V. S., et al., (May 2010). ChemInform Abstract: Synthesis, Antimicrobial and Antiviral Activities of Novel Polyphenolic Compounds. ChemInform, 27(22), no-no. doi: 10.1002/chin.19962222. 1 page.
Rheinhardt, J.H. et al., "Reduction of 4-(bromomethyl)-2-oxo-2H-chromen-7-yl acetate at carbon cathodes in dimethylformamide and acetonitrile: Lifetime of the electrogenerated radical-anion", Journal of Electroanalytical Chemistry, Feb. 2, 2011, pp. 44-51, vol. 654.
Saxena, Shweta et al., "Electrochemical Study of Novel 3-(6-bromo-2-oxo-2H-chromen- 3yl-amino)-2-(3-chloro-phenyl)- thiazolidine-4-one by Cyclic Voltammetry and its DNA Interaction Study by UV-Visible Spectroscopy", Chemical Science Transactions, Aug. 2015, pp. 21-29, vol. 5(1).
Extended European Search Report including Written Opinion for Application No. 23872949.5 dated Aug. 23, 2025. 12 pgs.

* cited by examiner

*Primary Examiner* — Jeremiah R Smith
(74) *Attorney, Agent, or Firm* — Lerner David LLP

(57) ABSTRACT

A non-aqueous electrolyte includes a lithium salt, an organic solvent, and an additive, wherein the additive includes a compound represented by Formula 1 below, and such non-aqueous electrolyte may be excellent in electrode film protection and an $O_2$ scavenging effect, so that cycle properties and resistance properties of a lithium secondary battery including the non-aqueous electrolyte may be simultaneously improved, and the amount of gas generation may be significantly reduced:

[Formula 1]

all the variables are described herein.

13 Claims, No Drawings

NON-AQUEOUS ELECTROLYTE AND LITHIUM SECONDARY BATTERY INCLUDING THE SAME

CROSS-REFERENCE TO RELATED APPLICATIONS

This application is a national stage entry under 35 U.S.C. § 371 of International Application No. PCT/KR2023/014391 filed on Sep. 21, 2023, which claims priority to Korean Patent Application No. 10-2022-0125851, filed on Sep. 30, 2022, all the disclosures of which are incorporated herein in their entirety by reference.

TECHNICAL FIELD

The present disclosure relates to a non-aqueous electrolyte and a lithium secondary battery including the same.

BACKGROUND

Recently, as the application fields of lithium secondary batteries have rapidly expanded to electricity, electronics, communications, and the supply of power to electronic apparatuses such as computers, as well as the power storage and supply for large-area apparatuses such as automobiles and power storage devices, high-capacity, high-output, and high-stability secondary batteries are increasingly demanded.

Particularly, in lithium secondary batteries for automotive applications, the high capacity, high power, and long lifespan properties are becoming important. In order to achieve the high capacity of lithium secondary batteries, it is contemplated to drive the lithium secondary batteries under a high voltage.

However, when a lithium secondary battery is driven under the high voltage, films or electrode surface structures formed on the surfaces of positive/negative electrodes may be deteriorated due to a side reaction caused by the deterioration of an electrolyte while the battery is being charged and discharged, and thus transition metal ions may be eluted from the surface of the positive electrode. The transition metal ions eluted as described above are electro-deposited on the negative electrode and degrade the passivation capability of a solid electrolyte interface (SEI) film of the negative electrode, thereby causing a problem of deterioration of the negative electrode. The deterioration phenomenon of a secondary battery tends to accelerate when the potential of a positive electrode increases, or when the battery is exposed to high temperatures.

In addition, when a lithium secondary battery is driven under the high voltage, there is a problem in that active oxygen is dissociated from a positive electrode active material included in a positive electrode, and the active oxygen causes a side reaction with an organic solvent such as a cyclic carbonate to occur in a non-aqueous electrolyte, generates a gas such as CO or $CO_2$, and continuously degrades battery durability.

SUMMARY

An aspect of the present disclosure provides a non-aqueous electrolyte which forms a stable film on positive/negative electrodes, thereby reducing electrolyte side reactions, has an excellent $O_2$ scavenging effect, reduces gas generation at the time of activation, and is effective in reducing the resistance of a secondary battery.

Another aspect of the present disclosure provides a lithium secondary battery including the above-described non-aqueous electrolyte, thereby reducing gas generation at the time of activation, having reduced resistance, and having excellent lifespan performance.

According to an aspect of the present disclosure, there is provided a non-aqueous electrolyte including a lithium salt, an organic solvent, and an additive, wherein the additive includes a compound represented by Formula 1 below.

[Formula 1]

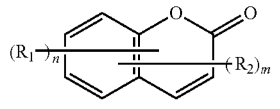

In Formula 1 above, $R_1$ is each independently a substituent including halogen, a nitrile group, a propargyl group, an ether group, a ketone group, a carboxy group, a substituted or unsubstituted alkyl group, a substituted or unsubstituted alkenyl group, a substituted or unsubstituted alkynyl group, a substituted or unsubstituted alkoxy group, a boron group, a borate group, an isocyanate group, an isothiocyanate group, a silyl group, a siloxane group, a sulfone group, a sulfonate group, a sulfate group, or a combination of two or more thereof, and $R_2$ is a substituent represented by Formula 2 below, and

[Formula 2]

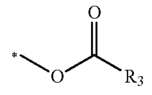

in Formula 2 above, $R_3$ is each independently selected from an alkyl group having 1 to 10 carbon atoms, an alkenyl group having 2 to 10 carbon atoms, or an alkynyl group having 2 to 10 carbon atoms, * is a bonding site, n is an integer of 0 to 5, m is an integer of 1 to 6, and n+m is an integer of 1 to 6.

According to an aspect of the present disclosure, there is provided a lithium secondary battery which includes a positive electrode including a positive electrode active material, a negative electrode including a negative electrode active material, a separator interposed between the positive electrode and the negative electrode, and the above-described non-aqueous electrolyte.

A non-aqueous electrolyte of the present disclosure is characterized by including, as an additive, a coumarin-based compound in which a substituent containing an ester group is substituted. The additive has excellent durability against positive/negative electrodes and enables formation of a film with reduced resistance, and thus, has effects of suppressing transition metal elution in a positive electrode and suppressing electrolyte side reactions in an electrode, and reduces gas generation at the time of activation. In addition, according to the non-aqueous electrolyte according to the present disclosure, a reactive oxygen compound generated from a positive electrode and a coumarin structure included in the compound represented by Formula 1 above are bonded, so that there is an effect ($O_2$ Scavenging effect) of suppressing decomposition of the electrolyte and gas generation.

Therefore, a lithium secondary battery including the above-described non-aqueous electrolyte may have resistance properties and lifespan properties, which are simultaneously improved.

DETAILED DESCRIPTION

It will be understood that words or terms used in the description and claims of the present disclosure shall not be construed as being limited to having the meaning defined in commonly used dictionaries. It will be further understood that the words or terms should be interpreted as having meanings that are consistent with their meanings in the context of the relevant art and the technical idea of the disclosure, based on the principle that an inventor may properly define the meaning of the words or terms to best explain the invention.

In the present disclosure, it should be understood that the terms "include," "comprise," or "have" are intended to specify the presence of stated features, numbers, steps, elements, or combinations thereof, but do not preclude the presence or addition of one or more other features, numbers, steps, elements, or combinations thereof.

Meanwhile, before describing aspects of the present disclosure, unless otherwise specified in the present disclosure, "*" refers to a connected portion (bonding site) between same or different atoms or end portions of formulas.

In addition, in the present disclosure, it will be understood that in the description of "a to b carbon atoms" herein, "a" and "b" each refer to the number of carbon atoms included in a specific functional group. That is, the functional group may include "a" to "b" carbon atoms. For example, an "alkyl group having 1 to 5 carbon atoms" refers to a C1-C5 alkyl group having 1 to 5 carbon atoms, that is, $CH_3$—, $CH_3CH_2$—, $CH_3CH_2CH_2$—, $(CH_3)_2CH$—, $CH_3CH_2CH_2CH_2$—, $(CH_3)_2CHCH_2$—, $CH_3CH_2CH_2CH_2CH_2$—, $(CH_3)_2CHCH_2CH_2$—, and the like.

In addition, in the present disclosure, an alkyl group, an alkenyl group, or an alkynyl group may all be substituted or unsubstituted. Unless otherwise defined, the term "substituted" means that at least one hydrogen bonded to carbon is substituted with an element other than hydrogen, and for example, it means being substituted with an alkyl group having 1 to 20 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, a heterocycloalkyl group having 3 to 12 carbon atoms, a heterocycloalkenyl group having 3 to 12 carbon atoms, an aryloxy group having 6 to 12 carbon atoms, a halogen atom, a fluoroalkyl group having 1 to 20 carbon atoms, a nitro group, an aryl group having 6 to 20 carbon atoms, a heteroaryl group having 2 to 20 carbon atoms, or a haloaryl group having 6 to 20 carbon atoms.

Hereinafter, aspects of the present disclosure will be described in more detail.

Non-Aqueous Electrolyte

The present disclosure relates to a non-aqueous electrolyte. More specifically, the non-aqueous electrolyte may be a non-aqueous electrolyte for a lithium secondary battery.

The non-aqueous electrolyte according to the present disclosure includes a lithium salt, an organic solvent, and an additive, wherein the additive includes a compound represented by Formula 1 below.

[Formula 1]

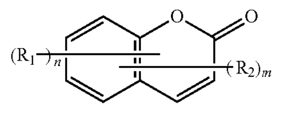

In Formula 1 above, $R_1$ is each independently a substituent including halogen, a nitrile group, a propargyl group, an ether group, a ketone group, a carboxy group, a substituted or unsubstituted alkyl group, a substituted or unsubstituted alkenyl group, a substituted or unsubstituted alkynyl group, a substituted or unsubstituted alkoxy group, a boron group, a borate group, an isocyanate group, an isothiocyanate group, a silyl group, a siloxane group, a sulfone group, a sulfonate group, a sulfate group, or a combination of two or more thereof, and $R_2$ is a substituent represented by Formula 2 below, and

[Formula 2]

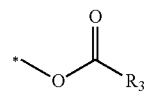

in Formula 2 above, $R_3$ is each independently selected from an alkyl group having 1 to 10 carbon atoms, an alkenyl group having 2 to 10 carbon atoms, or an alkynyl group having 2 to 10 carbon atoms, * is a bonding site, n is an integer of 0 to 5, m is an integer of 1 to 6, and n+m is an integer of 1 to 6.

A non-aqueous electrolyte of the present disclosure is characterized by including, as an additive, a coumarin-based compound in which a substituent containing an ester group is substituted. The additive has excellent durability against positive/negative electrodes and enables formation of a film with reduced resistance, and thus, has effects of suppressing transition metal elution in a positive electrode and suppressing electrolyte side reactions in an electrode, and reduces gas generation at the time of activation. In addition, according to the non-aqueous electrolyte according to the present disclosure, a reactive oxygen compound generated from a positive electrode and a coumarin structure included in the compound represented by Formula 1 above are bonded, so that there is an effect ($O_2$ Scavenging effect) of suppressing decomposition of the electrolyte and gas generation. Therefore, a lithium secondary battery including the above-described non-aqueous electrolyte may have resistance properties and lifespan properties, which are simultaneously improved.

(1) Lithium Salt

As the lithium salt used in the present disclosure, various lithium salts commonly used in a non-aqueous electrolyte for a lithium secondary battery may be used without limitation. For example, the lithium salt may include $Li^+$ as a cation, and may include, as an anion, at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$.

Specifically, the lithium salt may include at least one selected from the group consisting of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, $LiB(C_2O_4)_2$ (LiBOB), $LiCF_3SO_3$, $LiN(SO_2F)_2$ (LiFSI), $LiCH_3SO_3$, $LiCF_3CO_2$, $LiCH_3CO_2$, and $LiN(SO_2CF_2CF_3)_2$ (LiBETI). Specifically, the lithium salt may include at least one selected from the group consisting of $LiBF_4$, $LiClO_4$, $LiPF_6$, $LiB(C_2O_4)_2$ (LiBOB), $LiCF_3SO_3$, $LiN(SO_2CF_3)_2$ (LiTFSI), $LiN(SO_2F)_2$ (LiFSI), and $LiN(SO_2CF_2CF_3)_2$ (LiBETI).

In the non-aqueous electrolyte, the lithium salt may be included at a concentration of 0.5 M to 5 M, specifically 0.8 M to 4 M, and more specifically 0.8 M to 2.0 M. When the concentration of the lithium salt satisfies the above range, the $Li^+$ transference number and the degree of dissociation of lithium ions are improved, so that output properties of the battery may be improved.

(2) Organic Solvent

The organic solvent is a non-aqueous solvent commonly used in a lithium secondary battery, and is not particularly limited as long as being capable of minimizing decomposition caused by an oxidation reaction and the like during charging and discharging of a secondary battery.

Specifically, the organic solvent may include at least one selected from the group consisting of a cyclic carbonate-based organic solvent, a linear carbonate-based organic solvent, a linear ester-based organic solvent, and a cyclic ester-based organic solvent.

Specifically, the organic solvent may include a cyclic carbonate-based solvent, a linear carbonate-based solvent, or a mixture thereof.

The cyclic carbonate-based organic solvent is a high-viscosity organic solvent having a high dielectric constant, and thus capable of readily dissociating a lithium salt in an electrolyte. Specifically, the cyclic carbonate-based organic solvent may include at least one organic solvent selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, and more specifically, may include ethylene carbonate.

In addition, the linear carbonate-based organic solvent is an organic solvent having low viscosity and a low dielectric constant. Specifically, the linear carbonate-based organic solvent may include at least one selected from the group consisting of dimethyl carbonate (DMC), diethyl carbonate (DEC), dipropyl carbonate, ethylmethyl carbonate (EMC), methylpropyl carbonate, and ethylpropyl carbonate, and more specifically, may include ethylmethyl carbonate (EMC).

The organic solvent may be a mixture of a cyclic carbonate-based organic solvent and a linear carbonate-based organic solvent. At this time, the cyclic carbonate-based organic solvent and the linear carbonate-based organic solvent may be mixed at a volume ratio of 10:90 to 40:60, specifically, a volume ratio of 10:90 to 30:70, and more specifically, a volume ratio of 15:85 to 30:70. When the mixing ratio of a cyclic carbonate-based solvent and a linear carbonate-based solvent satisfies the above range, high-dielectric constant and low-viscosity properties are simultaneously satisfied, and excellent ion conductivity properties may be achieved.

In addition, in order to prepare an electrolyte having high ion conductivity, the organic solvent may include at least one carbonate-based organic solvent selected from the group consisting of the cyclic carbonate-based organic solvent and the linear carbonate-based organic solvent and may further include at least one ester-based organic solvent selected from the group consisting of a linear ester-based organic solvent and a cyclic ester-based organic solvent.

The linear ester-based organic solvent may specifically include at least one selected from the group consisting of methyl acetate, ethyl acetate, propyl acetate, methyl propionate, ethyl propionate, propyl propionate, and butyl propionate.

In addition, the cyclic ester-based organic solvent may include at least one selected from the group consisting of γ-butyrolactone, γ-valerolactone, γ-caprolactone, σ-valerolactone, and ε-caprolactone.

Meanwhile, if necessary, the organic solvent may additionally use any organic solvent commonly used in a non-aqueous electrolyte without limitation. For example, at least one organic solvent among an ether-based organic solvent, a glyme-based solvent, or a nitrile-based solvent may be additionally included.

As the ether-based solvent, any one selected from the group consisting of dimethyl ether, diethyl ether, dipropyl ether, methyl ethyl ether, methyl propyl ether, ethyl propyl ether, 1,3-dioxolane (DOL), and 2,2-bis(trifluoromethyl)-1,3-dioxolane (TFDOL), or a mixture of two or more thereof may be used, but the present disclosure is not limited thereto.

The glyme-based solvent is a solvent having a higher dielectric constant and lower surface tension than those of a linear carbonate-based organic solvent, and having less reactivity with a metal, and may include at least one selected from the group consisting of dimethoxyethane (glyme, DME), diethoxyethane, digylme, tri-glyme, and tetra-glyme (TEGDME), but is not limited thereto.

The nitrile-based solvent may be one or more selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, but is not limited thereto.

(3) Additive

The non-aqueous electrolyte according to the present disclosure includes a compound represented by Formula 1 below.

[Formula 1]

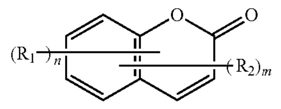

In Formula 1 above, $R_1$ is each independently a substituent including halogen, a nitrile group, a propargyl group, an ether group, a ketone group, a carboxy group, a substituted or unsubstituted alkyl group, a substituted or unsubstituted alkenyl group, a substituted or unsubstituted alkynyl group, a substituted or unsubstituted alkoxy group, a boron group, a borate group, an isocyanate group, an isothiocyanate group, a silyl group, a siloxane group, a sulfone group, a sulfonate group, a sulfate group, or a combination of two or more thereof, and $R_2$ is a substituent represented by Formula 2 below, and

[Formula 2]

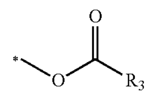

in Formula 2 above, $R_3$ is each independently selected from an alkyl group having 1 to 10 carbon atoms, an alkenyl group having 2 to 10 carbon atoms, or an alkynyl group having 2 to 10 carbon atoms, * is a bonding site, n is an integer of 0 to 5, m is an integer of 1 to 6, and n+m is an integer of 1 to 6. Meanwhile, in Formula 1, when there is a plurality of $R_2$ (when m is 2 to 6), each of the plurality of $R_2$ may be the same as or different from each other.

The compound represented by Formula 1 above is a coumarin-based compound including a substituent containing an ester group. A coumarin structure included in Formula 1 above has higher reaction energy with active oxygen than an organic solvent such as ethylene carbonate, and thus, is bonded to active oxygen prior to the organic solvent when the active oxygen is generated. Therefore, when the compound of Formula 1 above is included in the non-aqueous electrolyte, a reactive oxygen compound generated from the positive electrode and the coumarin structure included in the compound represented by Formula 1 above are bonded, so that there is an effect of suppressing decomposition of the electrolyte and gas generation.

In addition, the compound represented by Formula 1 above may be rapidly reduced and decomposed at the time of initial activation and form a stable solid electrolyte interphase (SEI) film on the surface of a negative electrode. The coumarin structure included in the compound represented by Formula 1 above has strong reduction properties in the negative electrode, and a ring structure is ring-open at the time of initial activation of a lithium secondary battery, making it possible to form a polyethylene oxide-based polymer-type SEI layer. The polymer-type SEI layer has the advantage of being excellent in flexibility and resilience. In addition, the substituent (Formula 2) containing an ester group and included in the compound represented by Formula 1 is preferred in terms of assisting in the formation of an SEI film having reduced resistance, helping to improve lithium ion conductivity due to oxygen contained therein when forming the SEI film, and promoting an SEI film formation reaction through the reduction in electron density of the substituent.

Therefore, a non-aqueous electrolyte which includes a compound of Formula 1 as an additive, the compound including both a coumarin structure and an ester-containing substituent, may reduce resistance against a negative electrode and form an SEI film excellent in durability, and thus, may improve lifespan performance and resistance properties of a lithium secondary battery including the non-aqueous electrolyte.

In Formula 1 above, n may be an integer of 0 to 5, m may be an integer of 1 to 6, and n+m may be an integer of 1 to 6, and specifically, in terms of the aforementioned resistance reduction and lifetime performance improvement, n may be an integer of 0 to 4, m may be an integer of 2 to 6, and n+m may be an integer of 2 to 6, and more specifically, in terms of maximizing the aforementioned resistance reduction and lifetime performance improvement, while maximizing the aforementioned resistance reduction and lifetime performance gain, due to the excessive number of ester-containing substituents, n may be an integer of 0 to 4, m may be 2, and n+m may be an integer of 2 to 6. Meanwhile, n may be 0 or 1.

Specifically, the compound represented by Formula 1 above may include at least one selected from the group consisting of a compound represented by Formula 1-A below and a compound represented by Formula 1-B below, and more specifically, may include a compound represented by Formula 1-A below.

[Formula 1-A]

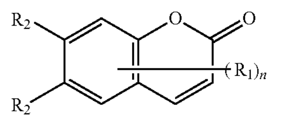

[Formula 1-B]

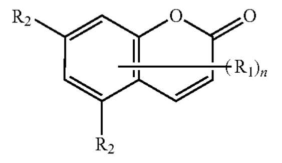

In Formula 1-A and Formula 1-B above, $R_1$, $R_2$, and n are as defined in Formula 1. Meanwhile, in Formula 1-A and Formula 1-B above, two $R_2$s may be the same as or different from each other.

If $R_2$ is substituted on coumarin as in Formula 1-A and Formula 1-B above, it is preferable in terms of promoting the SEI film formation reaction of the coumarin structure itself. Particularly, if two $R_2$s are substituted on coumarin as in Formula 1-A above, the SEI film formation reaction may be further promoted.

More specifically, the compound represented by Formula 1 above may include at least one selected from the group consisting of compounds represented by Formula 1-a below, Formula 1-b below, Formula 1-c below, and Formula 1-d below, and even more specifically, may include at least one selected from the group consisting of compounds represented by Formula 1-a below and Formula 1-b below.

[Formula 1-a]

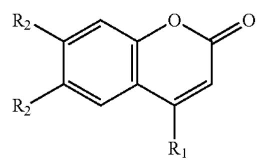

[Formula 1-b]

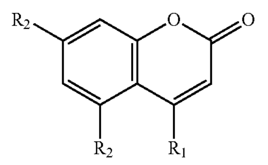

[Formula 1-c]

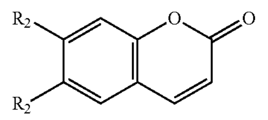

[Formula 1-d]

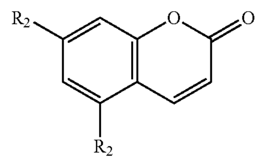

In Formula 1-a, Formula 1-b, Formula 1-c, and Formula 1-d above, $R_1$ and $R_2$ are as defined in Formula 1. In Formula 1-a and Formula 1-b above, two $R_2$s may be the same as or different from each other.

Meanwhile, in Formula 1 above, $R_1$ may be each independently a substituent including halogen, a nitrile group, a propargyl group, an ether group, a ketone group, a carboxy group, a substituted or unsubstituted alkyl group, a substituted or unsubstituted alkenyl group, a substituted or unsubstituted alkynyl group, a substituted or unsubstituted alkoxy group, a boron group, a borate group, an isocyanate group, an isothiocyanate group, a silyl group, a siloxane group, a sulfone group, a sulfonate group, a sulfate group, or a combination of two or more thereof, more specifically, may be each independently a substituted or unsubstituted alkyl group, even more specifically, may be an alkyl group having 1 to 10 carbon atoms, and even still more specifically, may be an alkyl group having 1 to 3 carbon atoms.

In addition, in Formula 2 above, $R_3$ may be each independently selected from an alkyl group having 1 to 10 carbon atoms, an alkenyl group having 2 to 10 carbon atoms, or an alkynyl group having 2 to 10 carbon atoms, and specifically, may be an alkyl group having 1 to 10 carbon atoms, and more specifically, an alkyl group having 1 to 3 carbon atoms.

In addition, the compound represented by Formula 1 above may specifically include at least one selected from the group consisting of compounds represented by Formula 1-a-1 to Formula 1-a-6 below, Formula 1-b-1 to Formula 1-b-6 below, Formula 1-c-1 to Formula 1-c-2 below, and Formula 1-d-1 to Formula 1-d-2 below, more specifically, may include at least one selected from the group consisting of compounds represented by Formula 1-a-1 to Formula 1-a-6 below and Formula 1-b-1 to Formula 1-b-6 below, even more specifically, may include compounds represented by Formula 1-a-1 below and Formula 1-b-3 below, and even still more specifically, may include a compound represented by Formula 1-a-1 below.

[Formula 1-a-1]

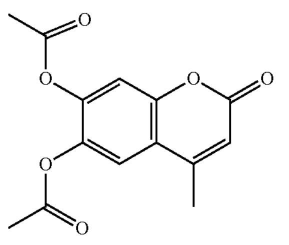

[Formula 1-a-2]

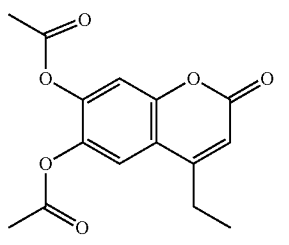

[Formula 1-a-3]

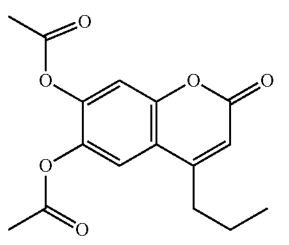

-continued

[Formula 1-a-4]

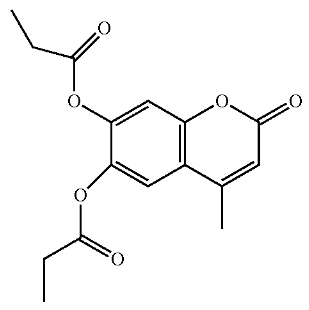

[Formula 1-a-5]

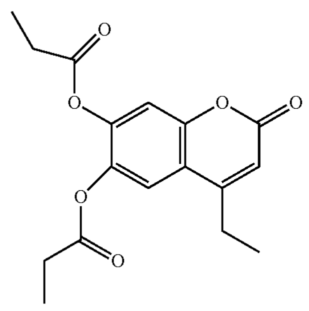

[Formula 1-a-6]

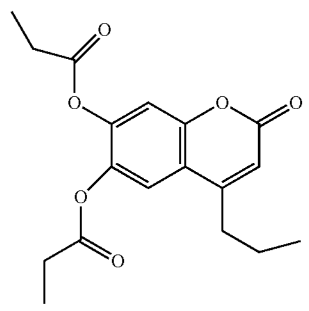

[Formula 1-b-1]

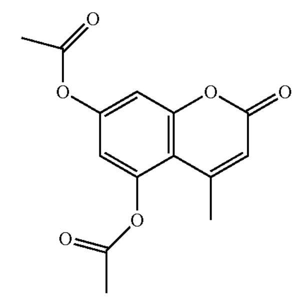

[Formula 1-b-2]

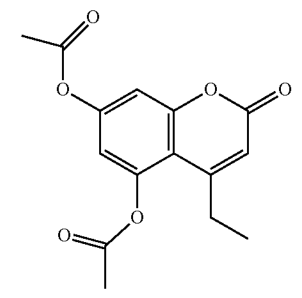

-continued

[Formula 1-b-3]

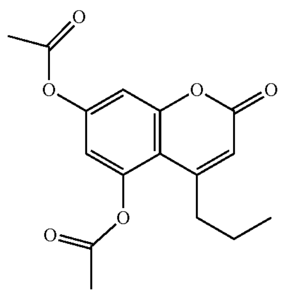

[Formula 1-b-4]

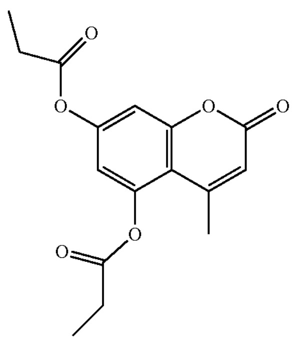

[Formula 1-b-5]

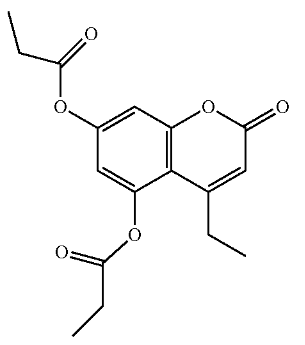

[Formula 1-b-6]

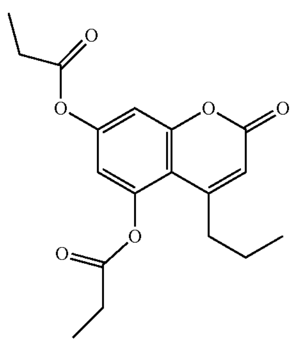

[Formula 1-c-1]

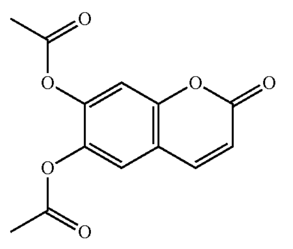

[Formula 1-d-1]

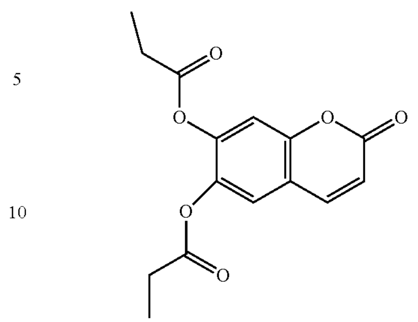

[Formula 1-d-2]

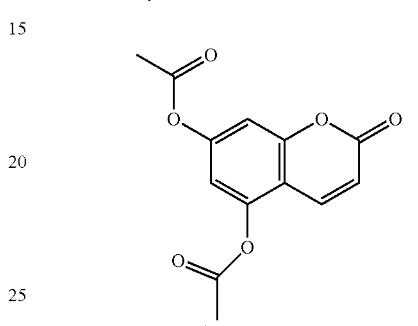

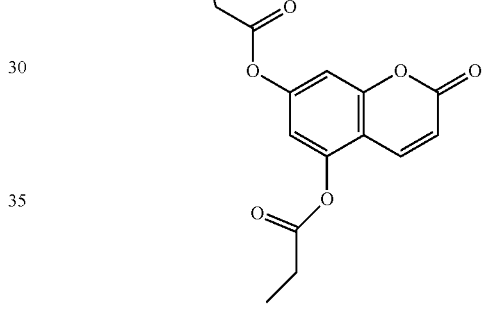

The compound represented by Formula 1 above may be included in an amount of 0.01 wt % to 5 wt %, specifically 0.05 wt % to 4.5 wt %, more specifically 0.2 wt % to 1.5 wt %, and even more specifically 0.4 wt % to 0.8 wt %, in the non-aqueous electrolyte. When the content of the compound represented by Formula 1 above satisfies the above range, it is preferable in terms of preventing an increase in resistance of a lithium secondary battery due to excessive addition and a corresponding decrease in life performance while fully exerting the aforementioned effect of protecting an electrode interface, and the effect of suppressing organic solvent decomposition and preventing side reactions.

The additive may further include an additional additive together with the compound of Formula 1 above. In addition, the additional additive may be included in the non-aqueous electrolyte to prevent the non-aqueous electrolyte from decomposing in a high-output environment and causing a negative electrode to collapse, or to improve low-temperature high-rate discharge properties, high-temperature stability, overcharge prevention, the effect of suppressing battery expansion at high temperatures, and the like.

Specifically, the additional additives may be at least one selected from the group consisting of vinylene carbonate, vinyl ethylene carbonate, fluoroethylene carbonate, 1,3-propane sultone, propene sultone, succinonitrile, adiponitrile, ethylene sulfate, $LiPO_2F_2$, lithium difluorooxalatoborate (LiODFB), lithium bis-(oxalato)borate (LiBOB), 3-trimethoxysilanyl-propyl-N-aniline (TMSPa), and tris(trimethylsilyl)phosphite (TMSPi), and more specifically, may be at least one selected from the group consisting of vinylene carbonate and 1,3-propane sultone.

The additional additive may be included in an amount of 0.1 wt % to 15 wt % in the non-aqueous electrolyte.

Lithium Secondary Battery

In addition, the present disclosure provides a lithium secondary battery including the above-described non-aqueous electrolyte.

Specifically, the lithium secondary battery includes a positive electrode including a positive electrode active material, a negative electrode including a negative electrode active material, a separator interposed between the positive electrode and the negative electrode, and the above-described non-aqueous electrolyte.

At this time, the lithium secondary battery of the present disclosure may be manufactured through a common method known in the art. For example, the lithium secondary battery of the present disclosure may be manufactured by forming an electrode assembly in which a positive electrode, a negative electrode, and a separator between the positive electrode and the negative electrode are sequentially stacked, followed by inserting the electrode assembly in a battery case, and then injecting the non-aqueous electrolyte according to the present disclosure thereto.

(1) Positive Electrode

The positive electrode includes a positive electrode active material.

The positive electrode may include a positive electrode current collector, and a positive electrode active material layer disposed on at least one surface of the positive electrode current collector. At this time, the positive electrode active material may be included in the positive electrode active material layer.

The positive electrode current collector is not particularly limited as long as having high conductivity without causing a chemical change in the battery. Specifically, the positive electrode current collector may include at least one selected from the group consisting of copper, stainless steel, aluminum, nickel, titanium, fired carbon, and an aluminum-cadmium alloy, and preferably aluminum.

The positive electrode current collector may typically have a thickness of 3 to 500 μm.

The positive electrode current collector may have fine irregularities formed on the surface thereof to improve the bonding force of the positive electrode active material. For example, the positive electrode current collector may be used in various forms such as a film, a sheet, a foil, a net, a porous body, a foam, or a non-woven body.

The positive electrode active material layer is disposed on at least one surface of the positive electrode current collector. Specifically, the positive electrode active material layer may be disposed on one surface or both surfaces of the positive electrode current collector.

The positive electrode active material layer may include a positive electrode active material.

The positive electrode active material is a compound capable of reversible intercalation and de-intercalation of lithium, and specifically, may include a lithium transition metal composite oxide including lithium and at least one transition metal selected from the group consisting of nickel, cobalt, manganese, and aluminum, and preferably a lithium transition metal composite oxide including lithium and a transition metal containing nickel, cobalt, and manganese.

For example, the lithium transition metal composite oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (where $0<Y<1$), $LiMn_{2-z}Ni_zO_4$ (where $0<Z<2$), etc.), a lithium-nickel-cobalt-based oxide (e.g., $LiNi_{1-Y1}Co_{Y1}O_2$ (where $0<Y1<1$), etc.), a lithium-manganese-cobalt-based oxide (e.g., $LiCo_{1-Y2}Mn_{Y2}O_2$ (where $0<Y2<1$), $LiMn_{2-z1}Co_{z1}O_4$ (where $0<Z1<2$, etc.), a lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}CO_{q1}Mn_{r2})O_4$ (where $0<p1<2$, $0<q1<2$, $0<r2<2$, and $p1+q1+r2=2$), etc.), or a lithium-nickel-cobalt-transition metal (M) oxide (e.g., $Li(Ni_{p2}Co_{q2}Mn_{r3}A_{s2})O_2$ (where M is selected from the group consisting of Al, Fe, V, Cr, Ti, Ta, Mg, and Mo, and p2, q2, r3, and s2 are each an atomic fraction of independent elements, where $0<p2<1$, $0<q2<1$, $0<r3<1$, $0<s2<1$, and $p2+q2+r3+s2=1$), etc.) and the like, and any one thereof or a compound of two or more thereof may be included. Among these, in terms of being able to increase the capacity and stability of a battery, the lithium transition metal composite oxide may be $LiCoO_2$, $LiMnO_2$, $LiNiO_2$, a lithium nickel-manganese-cobalt oxide (e.g., $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, etc.), or a lithium-nickel-cobalt-aluminum oxide (e.g., $Li(Ni_{0.8}Co_{0.15}Al_{0.05})O_2$, etc.), and the like. When considering a remarkable effect of improvement according to the control of types and content ratios of constituent elements forming a lithium transition metal composite oxide, the lithium transition metal composite oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$, and the like, and any one thereof or a mixture of two or more thereof may be used.

More specifically, the positive electrode active material is a lithium transition metal composite oxide, and may include in an amount of 60 mol % or greater of nickel with respect to the total number of moles of transition metals included in the lithium transition metal composite oxide. Specifically, the positive electrode active material is a lithium transition metal composite oxide, and the transition metal includes nickel, and at least one selected from manganese, cobalt, or aluminum, and may include the nickel in an amount of 60 mol % or greater, specifically 60 mol % to 90 mol %, with respect to the total number of moles of the transition metals. When the lithium transition metal composite oxide with a high content of nickel is used together with the above-described non-aqueous electrolyte solution, it is preferable in terms of reducing gaseous by-products generated due to structural collapse.

In addition, the positive electrode active material may include a lithium transition metal composite oxide represented by Formula 5 below.

[Formula 5]

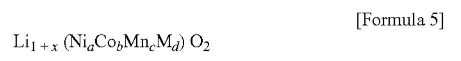

$$Li_{1+x}(Ni_aCo_bMn_cM_d)O_2$$

In Formula 5 above, M is one or more selected from W, Cu, Fe, V, Cr, Ti, Zr, Zn, Al, In, Ta, Y, La, Sr, Ga, Sc, Gd, Sm, Ca, Ce, Nb, Mg, B, or Mo, and 1+x, a, b, c, and d are each an atomic fraction of an independent element, where $0\leq x\leq 0.2$, $0.50\leq a<1$, $0<b\leq 0.25$, $0<c\leq 0.25$, $0\leq d\leq 0.1$, and $a+b+c+d=1$.

Preferably, the a, b, c, and d may respectively be $0.70 \leq a \leq 0.95$, $0.025 \leq b \leq 0.20$, $0.025 \leq c \leq 0.20$, and $0 \leq d \leq 0.05$.

In addition, the a, b, c, and d may respectively be $0.80 \leq a \leq 0.95$, $0.025 \leq b \leq 0.15$, $0.025 \leq c \leq 0.15$, and $0 \leq d \leq 0.05$.

In addition, the a, b, c, and d may respectively be $0.85 \leq a \leq 0.90$, $0.05 \leq b \leq 0.10$, $0.05 \leq c \leq 0.10$, and $0 \leq d \leq 0.03$.

Meanwhile, the positive electrode active material may include a hyper-lithium manganese-rich oxide containing at least 50 mol % of Mn among all metals excluding lithium, and having a molar ratio of lithium to transition metals greater than 1.

When the hyper-lithium manganese-rich oxide is used as a positive electrode active material, active oxygen is generated while the hyper-lithium manganese-rich oxide of a rock salt phase is being decomposed during an initial activation process. The active oxygen attacks and decomposes an organic solvent such as ethylene carbonate, and generates gases and resistor by-products, thereby degrading battery physical properties. However, in the present disclosure, since the non-aqueous electrolyte includes a compound of Formula 1 having higher reactivity with active oxygen than an organic solvent, the active oxygen generated in the initial activation process may be first bonded to the compound represented by Formula 1 above earlier than the organic solvent, thereby minimizing side effects caused by decomposition of the organic solvent.

The hyper-lithium manganese-rich oxide may be a compound represented by Formula 6 below.

[Formula 6]

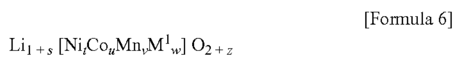

In Formula 6 above, $M^1$ is one or more elements selected from W, Cu, Fe, V, Cr, Ti, Zr, Zn, Al, In, Ta, Y, La, Sr, Ga, Sc, Gd, Sm, Ca, Ce, Nb, Mg, B or Mo. In addition, in Formula 6 above, it may be that $0.05 \leq s \leq 1$, $0 \leq t \leq 0.5$, $0 \leq u \leq 0.3$, $0.5 \leq v < 1.0$, $0 \leq w \leq 0.2$, and $0 \leq z \leq 1$, preferably that $0.05 \leq s \leq 1$, $0.1 \leq t \leq 0.5$, $0 \leq u \leq 0.1$, $0.5 \leq v < 1.0$, $0 \leq w \leq 0.2$, and $0 \leq z \leq 1$, and more preferably that $0.10 \leq s \leq 0.50$, $0.1 \leq t \leq 0.5$, $0 \leq u \leq 0.1$, $0.6 \leq v < 1.0$, $0 \leq w \leq 0.1$, and $0 \leq z \leq 0.50$.

More specifically, the hyper-lithium manganese-rich oxide may be a compound represented by Formula 6-1 below.

[Formula 6-1]

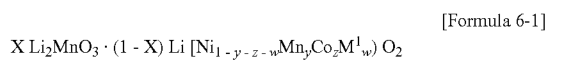

In Formula 6-1 above, $M^1$ is one or more elements selected from W, Cu, Fe, V, Cr, Ti, Zr, Zn, Al, In, Ta, Y, La, Sr, Ga, Sc, Gd, Sm, Ca, Ce, Nb, Mg, B or Mo. In addition, in Formula 6-1 above, it may be that $0.1 \leq X \leq 0.5$, $0.5 \leq y < 1$, $0 \leq z \leq 0.3$, and $0 \leq w \leq 0.2$, preferably that $0.2 \leq X \leq 0.5$, $0.5 \leq y < 1$, $0 \leq z \leq 0.1$, and $0 \leq w \leq 0.2$, and more preferably that $0.3 \leq X \leq 0.5$, $0.6 \leq y < 1$, $0 \leq z \leq 0.1$, and $0 \leq w \leq 0.2$.

The positive electrode active material may be included in the positive electrode active material layer in an amount of 80 wt % to 99 wt %, and preferably 92 wt % to 98.5 wt %, in consideration of exerting sufficient capacity of the positive electrode active material.

The positive electrode active material layer may further include a binder and/or a conductive material together with the above-described positive electrode active material.

The binder is a component for assisting in binding of an active material, a conductive material, and the like, and binding to a current collector. Specifically, the binder may include at least one selected from the group consisting of a polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene monomer (EPDM), a sulfonated EPDM, styrene-butadiene rubber, and fluorine rubber, and include preferably polyvinylidene fluoride.

The binder may be included in the positive electrode active material layer in an amount of 1 wt % to 20 wt %, and preferably 1.2 wt % to 10 wt %, in terms of securing sufficient binding force between components such as a positive electrode active material.

The conductive material may be used to assist and improve conductivity in the secondary battery, and is not particularly limited as long as having conductivity without causing a chemical change. Specifically, the positive electrode conductive material may include: graphite such as natural graphite or artificial graphite; a carbon-based material such as carbon black, acetylene black, Ketjen black, channel black, furnace black, lamp black, or thermal black; conductive fiber such as carbon fiber or metal fiber; a conductive tube such as a carbon nanotube; fluorocarbon; metal powder such as aluminum powder, or nickel powder; a conductive whisker such as zinc oxide or potassium titanate; a conductive metal oxide such as titanium oxide; or a polyphenylene derivative, and may preferably include carbon black in terms of improving conductivity.

In terms of securing sufficient electrical conductivity, the conductive material may be included in the positive electrode active material layer in an amount of 1 wt % to 20 wt %, and preferably 1.2 wt % to 10 wt %.

The thickness of the positive electrode active material layer may be 30 μm to 400 μm, and preferably 40 μm to 110 μm.

The positive electrode may be manufactured by coating the positive electrode current collector with a positive electrode slurry including a positive electrode active material, and selectively, a binder, a conductive material, and a solvent for forming a positive electrode slurry, and then drying and rolling the resultant.

The solvent for forming a positive electrode slurry may include an organic solvent such as N-methyl-2-pyrrolidone (NMP). The solid content of the positive electrode slurry may be 40 wt % to 90 wt %, and specifically 50 wt % to 80 wt %.

(2) Negative Electrode

The negative electrode may oppose the positive electrode.

The negative electrode includes a negative electrode active material.

The negative electrode may include a negative electrode current collector, and a negative electrode active material layer disposed on at least one surface of the negative electrode current collector. At this time, the negative electrode active material may be included in the negative electrode active material layer.

The negative electrode current collector is not particularly limited as long as having conductivity without causing a chemical change in the battery. Specifically, copper, stainless steel, aluminum, nickel, titanium, fired carbon, copper or stainless steel that is surface-treated with one of carbon, nickel, titanium, silver, and the like, an aluminum-cadmium alloy, and the like may be used as the negative electrode current collector.

The negative electrode current collector may typically have a thickness of 3 to 500 μm.

The negative electrode current collector may have fine irregularities formed on the surface thereof to improve the bonding force of the negative electrode active material. For example, the negative electrode current collector may be used in various forms such as a film, a sheet, a foil, a net, a porous body, a foam, or a non-woven body.

The negative electrode active material layer is disposed on at least one surface of the negative electrode current collector. Specifically, the negative electrode active material layer may be disposed on one surface or both surfaces of the negative electrode current collector.

The negative electrode active material layer may include a negative electrode active material.

The negative electrode active material is a material capable of reversibly intercalating/de-intercalating lithium ions, and may include at least one selected from the group consisting of a carbon-based active material, a (semi-)metal-based active material, and a lithium metal, and specifically, may include at least one selected from a carbon-based active material and a (semi-)metal-based active material.

The carbon-based active material may include at least one selected from the group consisting of artificial graphite, natural graphite, hard carbon, soft carbon, carbon black, graphene, and fibrous carbon, and may preferably include at least one selected from the group consisting of artificial graphite and natural graphite.

The average particle diameter ($D_{50}$) of the carbon-based active material may be 10 μm to 30 μm, and preferably 15 μm to 25 μm, in terms of ensuring structural stability during charge/discharge and decreasing side reactions with an electrolyte solution.

Specifically, the (semi-)metal-based active material may include at least one (semi-)metal selected from the group consisting of Cu, Ni, Na, K, Rb, Cs, Fr, Be, Mg, Ca, Sr, Si, Sb, Pb, In, Zn, Ba, Ra, Ge, Al, V, Ti, and Sn, an alloy of lithium and at least one (semi-)metal selected from the group consisting of Cu, Ni, Na, K, Rb, Cs, Fr, Be, Mg, Ca, Sr, Si, Sb, Pb, In, Zn, Ba, Ra, Ge, Al, V, Ti, and Sn, an oxide of at least one (semi-)metal selected from the group consisting of Cu, Ni, Na, K, Rb, Cs, Fr, Be, Mg, Ca, Sr, Si, Sb, Pb, In, Zn, Ba, Ra, Ge, Al, V, Ti, and Sn, lithium titanium oxide (LTO), lithium vanadium oxide, and the like.

More specifically, the (semi-)metal-based active material may include a silicon-based active material.

The silicon-based active material may include a compound represented by $SiO_x$ ($0 \le x < 2$). Since $SiO_2$ does not react with lithium ions, thereby not being able to store lithium, it is preferable that x is in the above range, and more preferably, the silicon-based active material may be SiO.

The average particle diameter ($D_{50}$) of the silicon-based active material may be 1 μm to 30 μm, and preferably 2 μm to 15 μm, in terms of ensuring structural stability during charge/discharge and decreasing side reactions with an electrolyte solution.

The negative electrode active material may be included in an amount of 60 wt % to 99 wt %, and preferably 75 wt to 95 wt % in the negative electrode active material layer.

The negative electrode active material layer may further include a binder and/or a conductive material together with the negative electrode active material.

At this time, the binder is used to improve battery performance by improving adhesion between the negative electrode active material layer and the negative electrode current collector, and may include, for example, at least any one selected from the group consisting of polyvinylidene-fluoride-hexafluoropropylene copolymer (PVDF-co-HFP), polyvinylidenefluoride (PVDF), polyacrylonitrile, polymethylmethacrylate, polyvinylalcohol, carboxymethylcellulose (CMC), starch, hydroxypropylcellulose, regenerated cellulose, polyvinylpyrrolidone, polytetrafluoroethylene, polyethylene, polypropylene, polyacrylic acid, ethylene-propylene-diene monomer (EPDM), sulfonated EPDM, styrene butadiene rubber (SBR), fluorine rubber, and a material having a hydrogen thereof substituted with Li, Na, Ca, or the like, and may also include various copolymers thereof.

The binder may be included in an amount of 0.5 wt % to 10 wt %, and preferably 1 wt % to 5 wt %, in the negative electrode active material layer.

The conductive material is not particularly limited as long as having conductivity without causing a chemical change in the battery, and for example, graphite such as natural graphite or artificial graphite; a carbon-based material such as carbon black, acetylene black, Ketjen black, channel black, furnace black, lamp black, or thermal black; conductive fiber such as carbon fiber or metal fiber; a conductive tube such as a carbon nanotube; fluorocarbon; metal powder such as aluminum powder, or nickel powder; a conductive whisker such as zinc oxide or potassium titanate; a conductive metal oxide such as titanium oxide; a conductive material such as a polyphenylene derivative, and the like may be used.

The conductive material may be included in an amount of 0.5 wt % to 10 wt %, and preferably 1 wt % to 5 wt %, in the negative electrode active material layer.

The thickness of the negative electrode active material layer may be 10 μm to 100 μm, and preferably 50 μm to 80 μm.

The negative electrode may be manufactured by coating at least one surface of a negative electrode current collector with a negative electrode slurry including a negative electrode active material, a binder, a conductive material, and/or a solvent for forming a negative electrode slurry, and then drying and rolling the resultant.

The solvent for forming a negative electrode slurry may include, for example, at least one selected from the group consisting of distilled water, N-methyl-2-pyrrolidone (NMP), ethanol, methanol, and isopropyl alcohol, preferably distilled water, in terms of facilitating the dispersion of the negative electrode active material, the binder, and/or the conductive material. The solid content of the negative electrode slurry may be 30 wt % to 80 wt %, and specifically 40 wt % to 70 wt %.

(3) Separator

In addition, as the separator, a common porous polymer film typically used as a separator, for example, a porous polymer film made of a polyolefin-based polymer, such as an ethylene homocopolymer, a propylene homocopolymer, an ethylene/butene copolymer, an ethylene/hexene copolymer, or an ethylene/methacrylate copolymer may be used alone, or a laminate thereof may be used. Alternatively, a common porous non-woven fabric, for example, a non-woven fabric made of glass fiber having a high melting point or polyethylene terephthalate fiber may be used, but the present disclosure is not limited thereto. Also, a coated separator including a ceramic component or a polymer material may be used to secure heat resistance or mechanical strength, and may be selectively used in a single-layered or a multi-layered structure.

The external shape of the lithium secondary battery of the present disclosure is not particularly limited, but may be a cylindrical shape using a can, a square shape, a pouch shape, a coin shape, or the like.

Hereinafter, the present disclosure will be described in more detail with reference to specific examples. However, the following examples are for illustrative purposes only to facilitate the understanding of the present disclosure, and do not limit the scope of the present disclosure. It will be apparent to those skilled in the art that various changes and modifications can be made without departing from the scope and spirit of the disclosure, and it is obvious that such variations and modifications are within the scope of the appended claims.

EXAMPLES AND COMPARATIVE EXAMPLES

Example 1

(Preparation of Non-Aqueous Electrolyte)

As an organic solvent, a mixture in which ethylene carbonate (EC) and ethyl methylcarbonate (EMC) were mixed at a volume ratio of 30:70 was used.

To the organic solvent, $LiPF_6$ as a lithium salt, a compound represented by Formula 1-a-1 below, and vinylene carbonate and 1,3-propane sultone as additional additives were added to prepare a non-aqueous electrolyte.

The $LiPF_6$ was included at a concentration of 1.0 M in the non-aqueous electrolyte.

The compound represented by Formula 1-a-1 below was included in an amount of 0.5 wt % in the non-aqueous electrolyte.

In addition, the non-aqueous electrolyte included vinylene carbonate and 1,3-propanesultone in an amount of 0.5 wt % each.

[Formula 1-a-1]

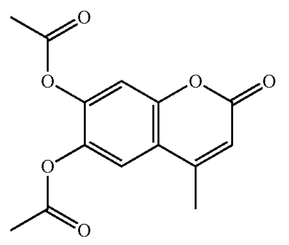

(Manufacturing of Lithium Secondary Battery)

A positive electrode active material ($Li_{1.35}[Ni_{0.35}Mn_{0.65}]O_2$, a hyper-lithium manganese-rich oxide), a conductive material (carbon black) and a binder (polyvinylidene fluoride) were added at a weight ratio of 96.0:1.5:2.5 to N-methyl-2-pyrrolidone (NMP), which is a solvent, to prepare a positive electrode slurry (solid content of 60 wt %). The positive electrode slurry was applied on one surface of a positive electrode current collector (Al thin film) having a thickness of 13.5 μm, and then dried and roll-pressed to manufacture a positive electrode.

A negative electrode active material (graphite), a conductive material (carbon black) and a binder (styrene-butadiene rubber) were added at a weight ratio of 97:1:2 to distilled water, which is a solvent, to prepare a negative electrode slurry (solid content of 60 wt %). The negative electrode slurry was applied on one surface of a negative electrode current collector (Cu thin film) having a thickness of 6 μm, and then dried and roll-pressed to manufacture a negative electrode.

In a dry room, a polyethylene porous film separator was interposed between the positive electrode and the negative electrode manufactured above, and then the prepared non-aqueous electrolyte was injected thereto to manufacture a secondary battery.

Example 2

A non-aqueous electrolyte and a secondary battery were manufactured in the same manner as in Example 1, except that 0.3 wt % of the compound represented by Formula 1-a-1 above was added to the non-aqueous electrolyte in Example 1.

Example 3

A non-aqueous electrolyte and a secondary battery were manufactured in the same manner as in Example 1, except that 1.0 wt % of the compound represented by Formula 1-a-1 above was added to the non-aqueous electrolyte in Example 1.

Example 4

A non-aqueous electrolyte and a secondary battery were manufactured in the same manner as in Example 1, except that a compound represented by Formula 1-b-3 below was added, instead of the compound represented by Formula 1-a-1 above, in an amount of 0.5 wt % to the non-aqueous electrolyte.

[Formula 1-b-3]

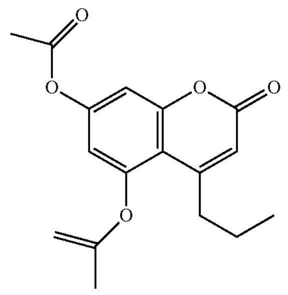

Comparative Example 1

A non-aqueous electrolyte and a secondary battery were manufactured in the same manner as in Example 1, except that the compound represented by Formula 1-a-1 above was not added.

Comparative Example 2

A non-aqueous electrolyte and a secondary battery were manufactured in the same manner as in Example 1, except that a compound represented by Formula X below was added, instead of the compound represented by Formula 1-a-1 above, in an amount of 0.5 wt % to the non-aqueous electrolyte.

[Formula X]

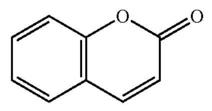

Comparative Example 3

A non-aqueous electrolyte and a secondary battery were manufactured in the same manner as in Example 1, except that a compound represented by Formula Y below was added, instead of the compound represented by Formula 1-a-1 above, in an amount of 0.5 wt % to the non-aqueous electrolyte.

[Formula Y]

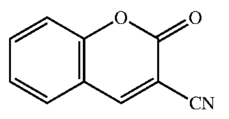

Experimental Examples

Experimental Example 1: Cycle Capacity Retention Rate Evaluation

The lithium secondary batteries of Examples 1 to 4 and Comparative Examples 1 to 3 manufactured above were charged to 4.35 V and 1/40 C under the conditions of CC/CV and 0.33 C at 45° C. using an electrochemical charge/discharge device, and then discharged to 2.0 V under the conditions of CC and 0.33 C, which was set to one cycle, and 150 cycles of the charge/discharge were performed to measure a capacity retention rate.

The capacity retention rate was calculated by the following equation, and the results are shown in Table 1 below.

$$\text{Capacity retention rate (\%)} = \{(\text{Discharge capacity after 150 cycles}/\text{Discharge capacity after 1 cycle})\}\times 100$$

Experimental Example 2: Resistance Evaluation

The lithium secondary batteries of Examples 1 to 4 and Comparative Examples 1 to 3 manufactured above were charged to 4.35 V and 1/40 C under the conditions of CC/CV and 0.33 C at 45° C., and then discharged to 2.0 V under the conditions of CC and 0.33 C, which was set to one cycle, and 150 cycles of the charge/discharge were performed.

After one cycle of the charge/discharge, the discharge capacity after one 1 cycle was measured using an electrochemical charge/discharge device, the SOC was adjusted to SOC 50%, and then a pulse of 2.5 C was applied for 10 seconds to calculate the initial resistance through the difference between the voltage before the pulse application and the voltage after the application.

After 150 cycles of the charge/discharge, the resistance after 150 cycles was calculated by the same method as the above method. The results are shown in Table 1 below.

Experimental Example 3: Gas Generation Amount Measurement

The secondary batteries of Examples 1 to 4 and Comparative Examples 1 to 3 were charged to 4.35 V and 1/40 C under the conditions of CC/CV and 0.33 C at 45° C., and then discharged to 2.0 V under the conditions of CC and 0.33 C to perform one cycle of charge/discharge, which ended in the discharge state, and then the amount of gas generation was measured using gas chromatography mass spectrometry (GC-MS).

TABLE 1

| | Experimental Example 1 Capacity | Experimental Example 2 | | Experimental Example 3 |
|---|---|---|---|---|
| | retention rate (%, @150-th cycle) | Initial resistance (mΩ) | Resistance after 150 cycles (mΩ) | Gas generation amount (μL) |
| Example 1 | 84.1 | 0.78 | 1.94 | 760 |
| Example 2 | 82.9 | 0.79 | 2.05 | 790 |
| Example 3 | 83.5 | 0.82 | 2.12 | 720 |
| Example 4 | 83.4 | 0.82 | 1.95 | 770 |
| Comparative Example 1 | 79.0 | 0.92 | 2.42 | 1050 |
| Comparative Example 2 | 81.0 | 0.80 | 1.93 | 845 |
| Comparative Example 3 | 82.5 | 0.80 | 2.02 | 844 |

Referring to Table 1, it can be confirmed that the lithium secondary batteries of Examples 1 to 4 using the non-aqueous electrolyte including the compound represented by Formula 1 simultaneously improve cycle-lifespan performance and resistance properties compared to the lithium secondary batteries of Comparative Examples 1 to 3, and significantly reduce the amount of gas generation.

Experimental Example 4: Metal Elution Amount Evaluation

Charging the secondary batteries of Example 1 and Example 4, and Comparative Examples 1 to 3 to 4.35 V and 1/40 C under the conditions of CC/CV and 0.33 C at 45° C., and then discharging the same to 2.0 V under the conditions of CC and 0.33 C was set to one cycle, and 150 cycles of the charge/discharge were performed.

Thereafter, an inductively coupled plasma optical emission spectrophotometer (ICP-OES) was used to measure the concentration of all metals eluted in the electrolyte solution. The amounts of metals measured using ICP analysis are shown in Table 2 below.

TABLE 2

| | Experimental Example 4 Metal elution amount (mg/kg, @150-th cycle) |
|---|---|
| Example 1 | 315 |
| Example 4 | 440 |
| Comparative Example 1 | 540 |
| Comparative Example 2 | 525 |
| Comparative Example 3 | 505 |

Referring to Table 2, it can be confirmed that the secondary batteries using the non-aqueous electrolyte solutions of Example 1 and Example 4 significantly reduce the amount of metal elution during cycle charge and discharge compared to the secondary batteries of Comparative Examples 1 to 3.

The invention claimed is:

1. A non-aqueous electrolyte comprising:

a lithium salt;

an organic solvent; and an additive, wherein the additive comprises at least one of a compound represented by Formula 1-A or a compound represented by Formula 1-B:

[Formula 1-A]

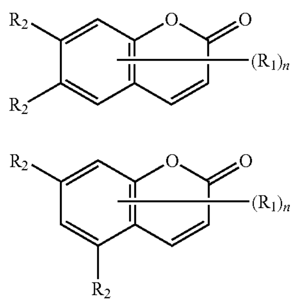

[Formula 1-B]

wherein in Formula 1-A and Formula 1-B, $R_1$ each independently comprises a halogen, a nitrile group, a propargyl group, an ether group, a ketone group, a carboxy group, a substituted or unsubstituted alkyl group, a substituted or unsubstituted alkenyl group, a substituted or unsubstituted alkynyl group, a substituted or unsubstituted alkoxy group, a boron group, a borate group, an isocyanate group, an isothiocyanate group, a silyl group, a siloxane group, a sulfone group, a sulfonate group, a sulfate group, or a combination of two or more thereof, and $R_2$ is a substituent represented by Formula 2,

[Formula 2]

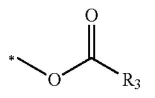

wherein in Formula 2, $R_3$ is each independently selected from an alkyl group having 1 to 10 carbon atoms, an alkenyl group having 2 to 10 carbon atoms, or an alkynyl group having 2 to 10 carbon atoms, * is a bonding site, n is an integer of 0 to 4.

2. The non-aqueous electrolyte of claim 1, wherein the additive comprises at least one of compounds represented by Formula 1-a, Formula 1-b, Formula 1-c, or Formula 1-d:

[Formula 1-a]

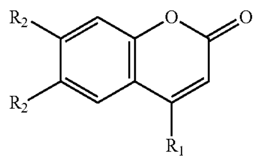

[Formula 1-b]

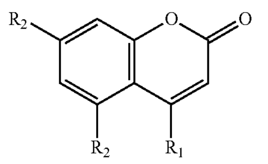

[Formula 1-c]

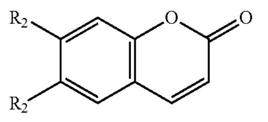

-continued

[Formula 1-d]

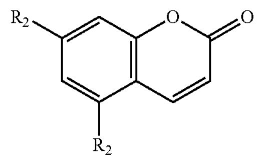

wherein in Formula 1-a, Formula 1-b, Formula 1-c, and Formula 1-d, $R_1$ and $R_2$ are defined as in Formula 1-A and Formula 1-B.

3. The non-aqueous electrolyte of claim 1, wherein the at least one of a compound represented by Formula 1-A or the compound represented by Formula 1-B is included in an amount of 0.01 wt % to 10 wt %, based on a total weight of the non-aqueous electrolyte.

4. The non-aqueous electrolyte of claim 1, wherein the lithium salt comprises at least one of LiCl, LiBr, LiI, $LiBF_4$, $LiClO_4$, $LiAlO_4$, $LiAlCl_4$, $LiPF_6$, $LiSbF_6$, $LiAsF_6$, $LiB_{10}Cl_{10}$, $LiB(C_2O_4)_2$ (LiBOB), $LiCF_3SO_3$, $LiN(SO_2F)_2$ (LiFSI), $LiCH_3SO_3$, $LiCF_3CO_2$, $LiCH_3CO_2$, or $LiN(SO_2CF_2CF_3)_2$ (LiBETI).

5. The non-aqueous electrolyte of claim 1, wherein the non-aqueous electrolyte comprises the lithium salt at a molar concentration of 0.5 M to 5.0 M.

6. The non-aqueous electrolyte of claim 1, wherein the organic solvent comprises at least one of a cyclic carbonate-based organic solvent, a linear carbonate-based organic solvent, a linear ester-based organic solvent, or a cyclic ester-based organic solvent.

7. The non-aqueous electrolyte of claim 1, wherein the additive further comprises at least one additional additive selected from vinylene carbonate, vinylethylene carbonate, fluoroethylene carbonate, propane sultone, propene sultone, succinonitrile, adiponitrile, ethylene sulfate, $LiPO_2F_2$, lithium difluorooxalatoborate (LiODFB), lithium bis-(oxalato) borate (LiBOB), 3-trimethoxysilanyl-propyl-N-aniline (TMSPa), or tris(trimethylsilyl)phosphite (TMSPi).

8. The non-aqueous electrolyte of claim 1, wherein the additive comprises at least one compound represented by Formula 1-a-1, Formula 1-a-2, Formula 1-a-3, Formula 1-a-4, Formula 1-a-5, Formula 1-a-6, Formula 1-b-1, Formula 1-b-2, Formula 1-b-3, Formula 1-b-4, Formula 1-b-5, Formula 1-b-6, Formula 1-c-1, Formula 1-c-2, Formula 1-d-1, or Formula 1-d-2:

[Formula 1-a-1]

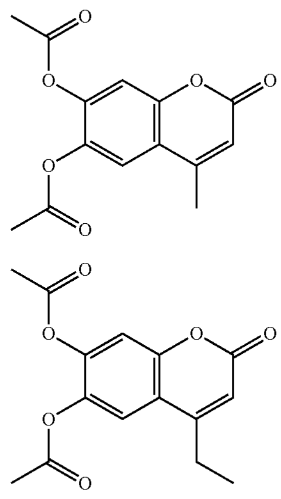

[Formula 1-a-2]

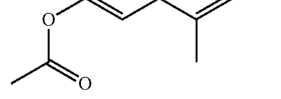

-continued
[Formula 1-a-3]
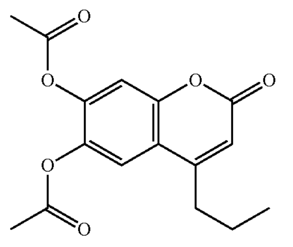
[Formula 1-a-4]
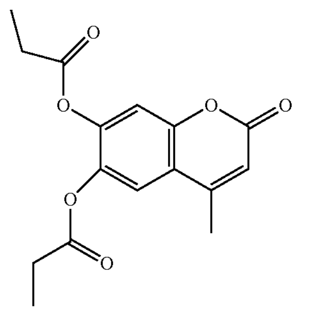
[Formula 1-a-5]
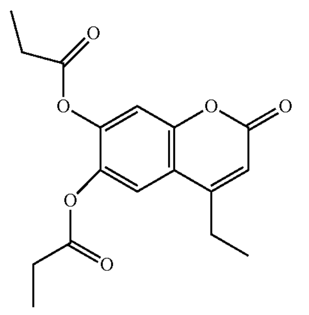
[Formula 1-a-6]
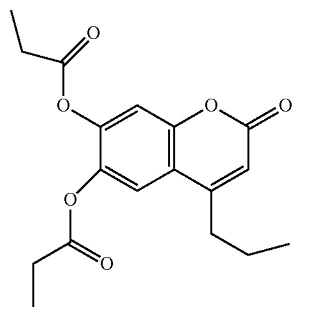
[Formula 1-b-1]
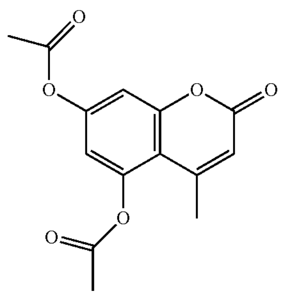
[Formula 1-b-2]
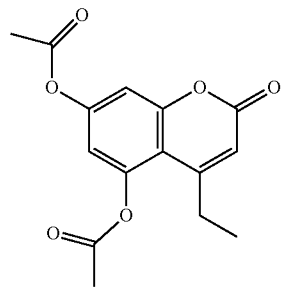
[Formula 1-b-3]
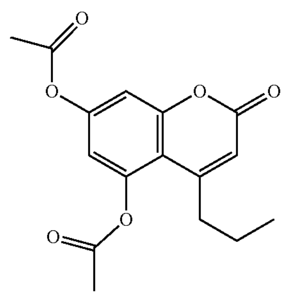
[Formula 1-b-4]
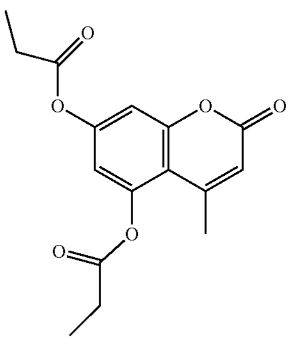
[Formula 1-b-5]
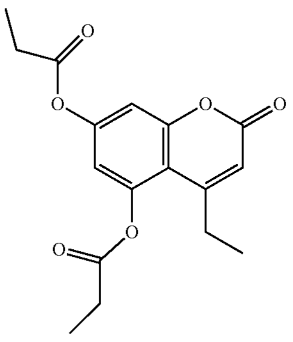
[Formula 1-b-6]
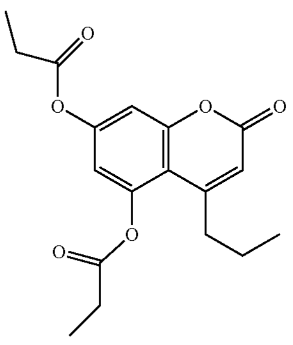

-continued

[Formula 1-c-1]

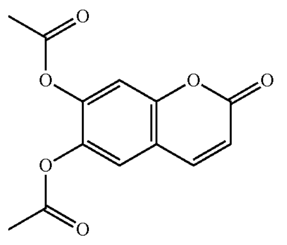

[Formula 1-d-1]

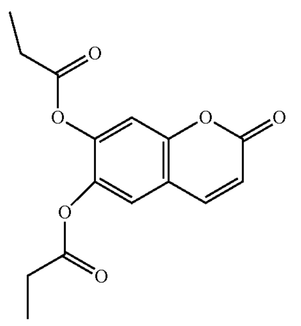

[Formula 1-d-2]

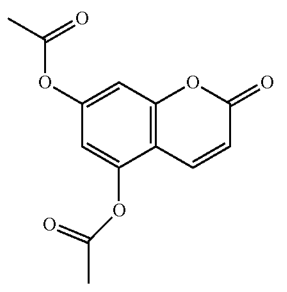

-continued

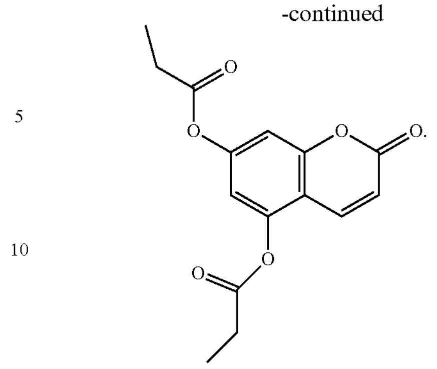

9. The lithium secondary battery of claim 1, wherein $R_3$ is an alkenyl group having 2 to 10 carbon atoms or an alkynyl group having 2 to 10 carbon atoms.

10. A lithium secondary battery comprising:

a positive electrode comprising a positive electrode active material;

a negative electrode comprising a negative electrode active material;

a separator interposed between the positive electrode and the negative electrode; and a non-aqueous electrolyte according to claim 1.

11. The lithium secondary battery of claim 10, wherein the positive electrode active material comprises a hyper-lithium manganese-rich oxide containing 50 mol % or greater of Mn among all metals excluding lithium, and having a molar ratio of lithium to transition metals greater than 1.

12. The lithium secondary battery of claim 11, wherein the hyper-lithium manganese-rich oxide is a compound represented by Formula 6:

[Formula 6]

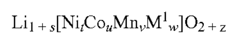

$$Li_{1+s}[Ni_tCo_uMn_vM^1_w]O_{2+z}$$

wherein in Formula 6 above, $M^1$ is one or more selected from W, Cu, Fe, V, Cr, Ti, Zr, Zn, Al, In, Ta, Y, La, Sr, Ga, Sc, Gd, Sm, Ca, Ce, Nb, Mg, B, or Mo, and $0.05 \leq s \leq 1$, $0 \leq t \leq 0.5$, $0 \leq u \leq 0.3$, $0.5 \leq v < 1.0$, $0 \leq w \leq 0.2$, and $0 \leq z \leq 1$.

13. The lithium secondary battery of claim 10, wherein at least a portion of the compound represented by Formula 1-A or the compound represented by Formula 1-B is bonded to a reactive oxygen compound generated from the positive electrode.

* * * * *